United States Patent [19]

Erhan

[11] Patent Number: 4,981,946
[45] Date of Patent: Jan. 1, 1991

[54] MARINE PAINT COMPOSITION COMPRISING QUINONE/POLYAMINE POLYMER

[76] Inventor: Semih Erhan, 2301 Cherry St., Apt. 12B, Philadelphia, Pa. 19103

[21] Appl. No.: 280,141

[22] Filed: Dec. 5, 1988

Related U.S. Application Data

[63] Continuation-in-part of Ser. No. 890,904, Jul. 28, 1986, Pat. No. 4,831,107.

[51] Int. Cl.$^5$ .............................................. C08G 73/00
[52] U.S. Cl. ..................... 528/229; 524/173; 524/361; 524/379; 524/612; 528/25; 528/38; 528/125; 528/211; 528/392
[58] Field of Search .................. 528/229, 125, 128, 25, 528/38, 392, 211; 524/612, 361, 173, 379

[56] References Cited

U.S. PATENT DOCUMENTS 3,198,767  8/1965  Matsuda et al. ................... 528/229
4,831,107  5/1989  Erhan .................................. 528/229

OTHER PUBLICATIONS

Hay, U.S. Pat. No. 3,306,875; cols. 1–2, 35–36.

*Primary Examiner*—Harold D. Anderson
*Attorney, Agent, or Firm*—Eckert Seamans Cherin & Mellott

[57] ABSTRACT

A marine paint composition comprising a polymer of the formula:

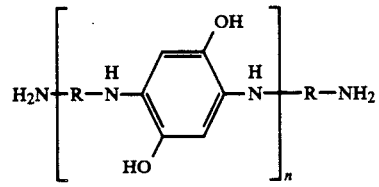

wherein R is alkyl, monocyclic cycloalkyl, monocyclic heterocyclic, aromatic, siloxy, silyl and the alkyl, alkoxy, carboxyl and amino substituted derivatives thereof, and n is about 70 to 700, and a suitable carrier.

10 Claims, No Drawings

MARINE PAINT COMPOSITION COMPRISING QUINONE/POLYAMINE POLYMER

RELATED APPLICATION

This application is a continuation-in-part of application Ser. No. 890,904, filed July 28, 1986 of Erhan, U.S. Pat. No. 4,831,107.

FIELD OF THE INVENTION

This invention relates to a marine coating composition for use as a protective coating for metal surfaces, especially marine vehicles to prevent corrosion. More particularly, the present invention relates to a marine paint composition comprising a novel class of polymers which can displace water and can produce protective coatings under wet conditions.

BACKGROUND OF THE INVENTION

Anti-corrosive coatings are, for example, applied to bridges, steel structures which are exposed to weather for long periods during the erection of buildings, car, aeroplane and other vehicle bodies and components, agricultural machinery, oil installations and exposed steel work on ships. An anti-corrosive coating (a "shop primer") may be applied to freshly blasted steel plate which is to be stored before use in construction or shipbuilding.

Coatings of diverse formulations have become indispensible for the maintenance and survival of nearly every construction material used in all conceivable structures from buildings to bridges to ships, airplanes, etc. Because objects exposed to air face changes in temperature and moisture in a cyclical fashion, unprotected materials rust, crack, disintegrate without such protection. In the oceans, salt causes electrochemical corrosion and living organisms pose an additional problem of fouling. Taking this last problem as an example, one can cite the efforts spanning the last couple of decades as having resulted in the development of organic biocides that are incorporated into paints and the ablative coatings and highly fluorinated polymers used in coatings. The former functions by slowly disintegrating thus removing the attached organisms through this phenomenon. The latter provides a surface that does get fouled but can be easily cleaned. Organic tin compounds being nonspecific toxic chemicals have recently been banned due to environmental concerns. Even before that they represented a solution that had to be repeated regularly, every 2-4 years, because one could incorporate only a limited amount of these compounds into the thin paint layer. Ablative coatings, too, had to be reapplied since after a number of years not much coating remained attached to the surface.

Furthermore, both ablative coatings but especially highly fluorinated coatings are very expensive. All of them can only be applied to a completely dry clean surface. The present invention offers distinct advantages even in this highly specialized field of use while providing a much broader spectrum of application possibilities in many other areas with unique advantages.

SUMMARY OF THE INVENTION

The present invention relates to a paint composition comprising a novel class of polymers in a suitable solvent.

More particularly, the polymers utilized in the paint composition have the general formula:

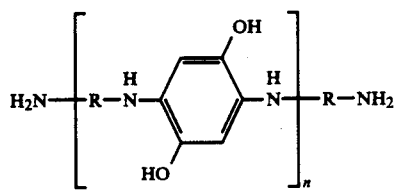

wherein R is alkyl, monocyclic, cycloalky, monocyclic heterocyclic, aromatic, siloxylyl, silyl and the alkyl, alkoxy, carboxyl and amino substituted derivatives thereof, and n is about 70 to 7000.

Advantageously, the molecular weight of the polymer is 10,000 to 1,000,000, preferably 10,000 to 40,000. Most preferable are the polymers wherein R is

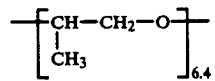

and the molecular weight of the polymer is about 10,000 to 15,000.

The solvents which may be used in preparing the paint compositions of the invention include lower alkanols such as methanol, ethanol, etc., acetone, DMSO dimethylacetamide, and the like.

The compositions can be applied by dipping, spraying, brushing and melt coating. The compositions can also be applied under water. Once cured they are insoluble in solvents and impervious to water, salt water, boiling and autoclaving. They are non-wettable by water and hence ice also does not adhere to them. They can displace water from surfaces of metals, siliceous and composite materials, including dripping wet rusted steel surfaces due to a phenomena called chemisorption.

The coatings can be quickly cured with heat or IR radiation.

DESCRIPTION OF THE PREFERRED EMBODIMENT OF THE INVENTION

In accordance with the present invention there is provided a marine paint composition comprising a polymer of the formula:

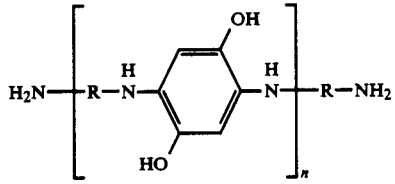

herein R is alkyl, monocyclic cycloalkyl, monocyclic heterocyclic, aromatic, siloxylyl, silyl, and the alkyl, alkoxy, carboxyl and amino derivatives thereof, and n is about 70 to 700.

The polymers of the invention have a molecular weight of about 10,000 to 1,000,000, preferable 10,000 to 40,000.

The polymer is prepared by the condensation reaction of a polyamine and a suitable quinone. Among the various polyamines which may be used are the following:
diethylene triamine
triethyl tetraamine
tetraaminobenzene
diamino benzidine
tetraamino pyrimidine
Jeffamines,
1,4 diamino cyclohexane
1,2 diamino cyclohexane
trimethyl hexamethylene diamine
dimethylthiotoluene diamine
t - butyl toluene diamine
benzidine
1,2 - dianilinolethane
4,4'- diaminodicyclohexylnethane
4,4'- diaminodiphenylether
bis (p - aminophenoxy) dimethylsilane
4,4'- methylene - bis-o-ethylaniline
bis (3-aminopropyl) tetramethyl disiloxane
2- methylpentamethylene diamine
amino alkyl silicone fluid
4,4'- diamino - 3,3'- dinitrodiphenyl ether
4,4'- diamino - 1,1'- binaphthyl
4.4'- sulfonyl dianiline
3,3'- sulfonyl dianiline
3,3, 4.4'- tetraamino benzophenone
2, 4,6 - triamino pyridine
2,4, 5, 6 - tetraamine pyrimidine
4.5 - dimethyl - 1,2 - phenylenediamine
diethyltoluene diamine
m - aminophenyl - (4.4'- oxyaniline) ether
1,12 - diaminododecane
1,10 - diaminodecane
1,8 - diaminooctane
1,5 - diaminopentane
3,3', 4.4 - tetraamine diphenyl
2,4 - diamino-6-mercapto pyridine hemisulfate
3,5 - diamino triazole, and
1,8 - diaminonaphthalene.

The quinones which are advantageously utilized to prepare the polymers of the invention include
2 - phenylquinone
2,5 - diphenylquinone,
diphenoquinone,
o - benzoquinone and
p - benzoquinone The polymers prepared by reacting quinone compounds and Jeffamines are novel polymers. Preferable of the Jeffamines are those having the formula:

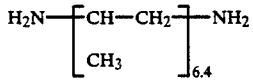

D400

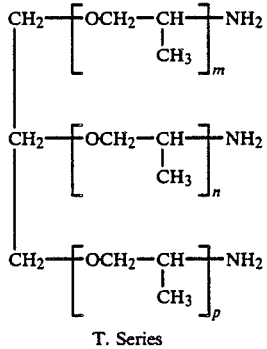

T. Series

D

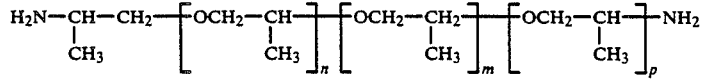

ED

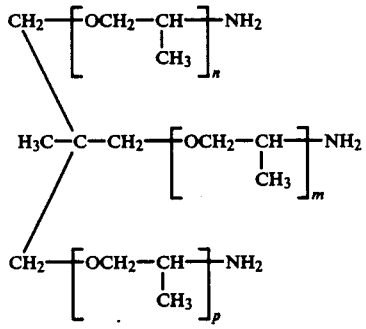

T403 wherein n, m and p are each 70 to 700.

The polymers of the present invention are prepared generally as follows:
1. Polyamines are dissolved in an aqueous solution of ethanol, acetone or mixture thereof.
2. Quinones such as 0- and p-benzoquinone, naphthaquinones and anthraquinones or the quinone precursors diphenols are dissolved in ethanol or other appropriate solvents. Oxidation of diphenols can be effected by air, oxidizing agents or enzymes.
3. The reactant solutions are mixed in a mol ratio of 10:1 to 1:10, preferably one of two moles of amines to three moles of quinone and refluxed 3–8 hours with stirring.
4. The solvent is removed under vacuum.
5. The product is washed with water until the wash water is clear.
6. To prepare the coating composition, the product is dissolved in a suitable solvent such as DMSO, acetone or alkanol and applied either by dipping, spraying or brushing. The product can also be used to spin fibers from solution or melt.
7. The dried panel is cured either by heat or chemically using compounds from a group comprising quinones and aliphatic or aromatic amines. Heating can be effected in an oven at 125–175° C. for 1 hour or by an IR lamp for 20 minutes.

EXAMPLE I

Preparation of the product of Jeffamine D400 and p-benzoquinone 16.0g (0.04 moles) of Jeffamine D400 was dissolved in 50ml ethanol. To this solution, in a round bottomed flask equipped with a reflux condenser, was added 6.48g (0.06 moles) of p-benzoquinone in 50ml ethanol. The mixture was refluxed on a water bath for 3 hours, the ethanol was removed in a rotary evaporator and the remaining syrup was washed, first with cold water, then with hot water, after dissolving the syrup in acetone, until the wash water was colorless (about 5l of water altogether). The residue was dried in a vacuum oven at 50° C. for 4–5 hours. The polymer was soluble in ethanol, acetone, DMSO and insoluble in water and ether.

In lieu of Jeffamine D400 there may be used any one of the following polyamines to prepare a polymer of the invention;
bis (p-aminophenoxy) dimethyl silane;
1.3-bis (3-aminopropyl) - 1,1 3,3 - tetramethyl disiloxane;
1.4-bis (3-aminopropyldimethylmethylsilyl benzene of dimethyldodecane.

EXAMPLE II

Preparation of the product of 1,3 bis (3-aminophenoxy) benzene and p-benzoquinone Following the procedure of Example I, 2.92g (0.01 mole) of 1.3 bis (3-aminophenoxy) benzene and 3.24g (0.03 moles) of p-benzoquinone were dissolved in 100 ml ethanol. The mixture was refluxed for 3 hours during which the product precipitated. The product was washed with warm ethanol and dried at 50° C. in vacuo for over 3 hours. The product is soluble in DMSO, dimethylacetamide and insoluble in water, ethanol and acetone. It softens at 140° C. and forms a liquid melt at 155° C. In TGA the product loses 5% of its weight at 400° C.

EXAMPLE III

Preparation of the product of 4,4 diaminodiphenyl methane and p-benzoquinone:

Following the procedure of Example I, 3.96g (0.02 moles) of 4'4' diaminodiphenylmethane and 3.24g (0.03 moles) of p-benzoquinone were dissolved in ethanol and refluxed for 3 hours. The brown precipitate that forms was filtered and washed with ethanol. The brown powder melts at 178° C. Its inherent viscosity is 0.0645.

EXAMPLE IV

Application of the polymer I as a coating

A 20% solution was prepared in acetone and sprayed on aluminum, steel glass, composite panels. They were allowed to dry and either placed in an oven for 1 hour at 150° C. or heated with an IR lamp for 20 minutes at a distance of 3 inches.

EXAMPLE V 85 gr of the polymer of Example I was dissolved in a mixture consisting of 12.75 gr of super high flash naphtha 1.5 gr. methylethyl ketone and 0.75 g propasol solvent B. 0.2% Raybo 63 and 0.2% Tergitol NP-18 were added. The flash point of the mixture was 106° F., Viscosity 2007 cS, drying time 5 hours. When sprayed on wet, rusty steel panels, water was observed to run down from the panels.

EXAMPLE VI 85 g of polymer of Example II was dissolved in a mixture consisting of 10.5 g super high flash naphtha, 4.5 gr n-butanol, to which 0.2% Tergitol NP-18 and Raybo 63 were added. The flash point of the mixture was 112° F., viscosity 1583 cS and drying time 5 hours.

It too displaced water from wet rusty metal surfaces after spraying.

Both coatings could be applied under water by a roller.

What is claimed is:

1. A polymer of the formula:

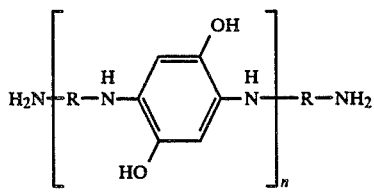

wherein R is

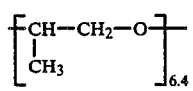

and n is 70 to 700.

2. A marine paint composition comprising a polymer of the formula:

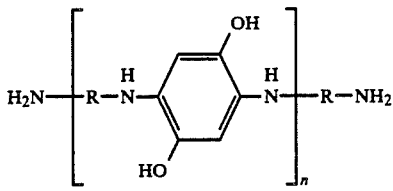

wherein R is divalent alkyl, monocyclic cycloalkyl, monocyclic heterocyclic 2,5-diamino pyrimidine or 2,4,6-triamino pyrimidine, aromatic, siloxyl, silyl or the alkyl, or amino substituted derivatives thereof, and n is about 70 to 700, and a suitable carrier.

3. The composition of claim 2, wherein the carrier is selected from the group consisting of alkanol, acetone and dimethysulfoxide.

4. The composition of claim 2, wherein R is polyoxypropylene.

5. The composition of claim 2, wherein R is alkyl.

6. The composition of claim 2, wherein R is divalent cycloalkyl.

7. The composition of claim 2, wherein R is divalent pyrimidyl.

8. The composition of claim 2, wherein said polymer is the reaction product of a polyamine and a quinone selected from the group consisting of o-benzoquinone p-benzoquinone, phenylquinone and diphenylquinone.

9. The composition of claim 2, wherein said polymer is the reaction product of benzoquinone and a polyamide.

10. The marine paint composition having the characteristic of displacing water from wet, rusty metal surfaces and being insoluble in solvents and impervious to water, said polymer comprising the reaction product of a polyamine selected from the group consisting of:

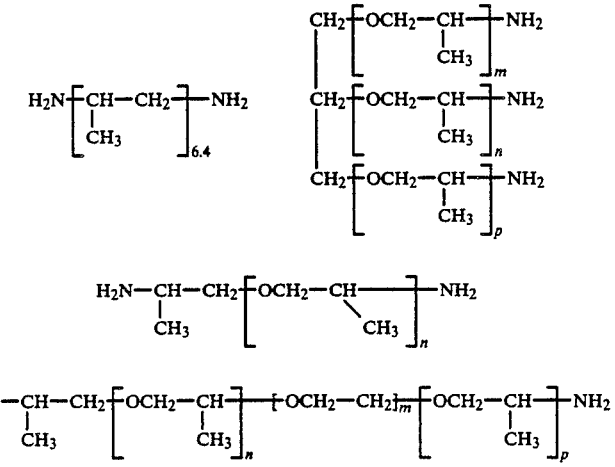

and a quinone selected from the group consisting of o-benzoquinone and p-bensoquinone, wherein m, n and p are each 70 to 700.

* * * * *